United States Patent [19]
Alain

[11] Patent Number: 5,145,275
[45] Date of Patent: Sep. 8, 1992

[54] TRUSS BEAM COUPLER

[76] Inventor: Claude Alain, 2800 Dalton, Sainte-Foy, Quebec, Canada, G1P 3S4

[21] Appl. No.: 815,036

[22] Filed: Dec. 31, 1991

[51] Int. Cl.$^5$ ................................................ F16D 1/00
[52] U.S. Cl. .................................... 403/171; 403/176; 403/326; 403/329
[58] Field of Search .............. 403/326, 329, 108, 325, 403/171, 176

[56] References Cited

U.S. PATENT DOCUMENTS

| | | | |
|---|---|---|---|
| 1,488,014 | 3/1924 | McDonald | 403/329 X |
| 3,452,584 | 7/1969 | Jones | 403/326 X |
| 4,520,608 | 6/1985 | Baus | 403/329 X |
| 4,711,595 | 12/1987 | Magid et al. | 403/329 X |

Primary Examiner—Andrew V. Kundrat
Attorney, Agent, or Firm—Pierre Lespérance; Francois Martineau

[57] ABSTRACT

A node coupler for interlocking truss beams of a self-standing structure. The coupler includes at least one pair of diverging elongated arms. Each arm has a cylindrical inner end portion and a thin outer end portion, engaged into the cylindrical hollow of a given truss beam. A slit is made in the arm outer end portion, to release a spring-loaded U-shape clip. The U-clip has a transverse finger to engage a bore in the wall of the truss beam, under the bias of the clip spring load.

7 Claims, 3 Drawing Sheets

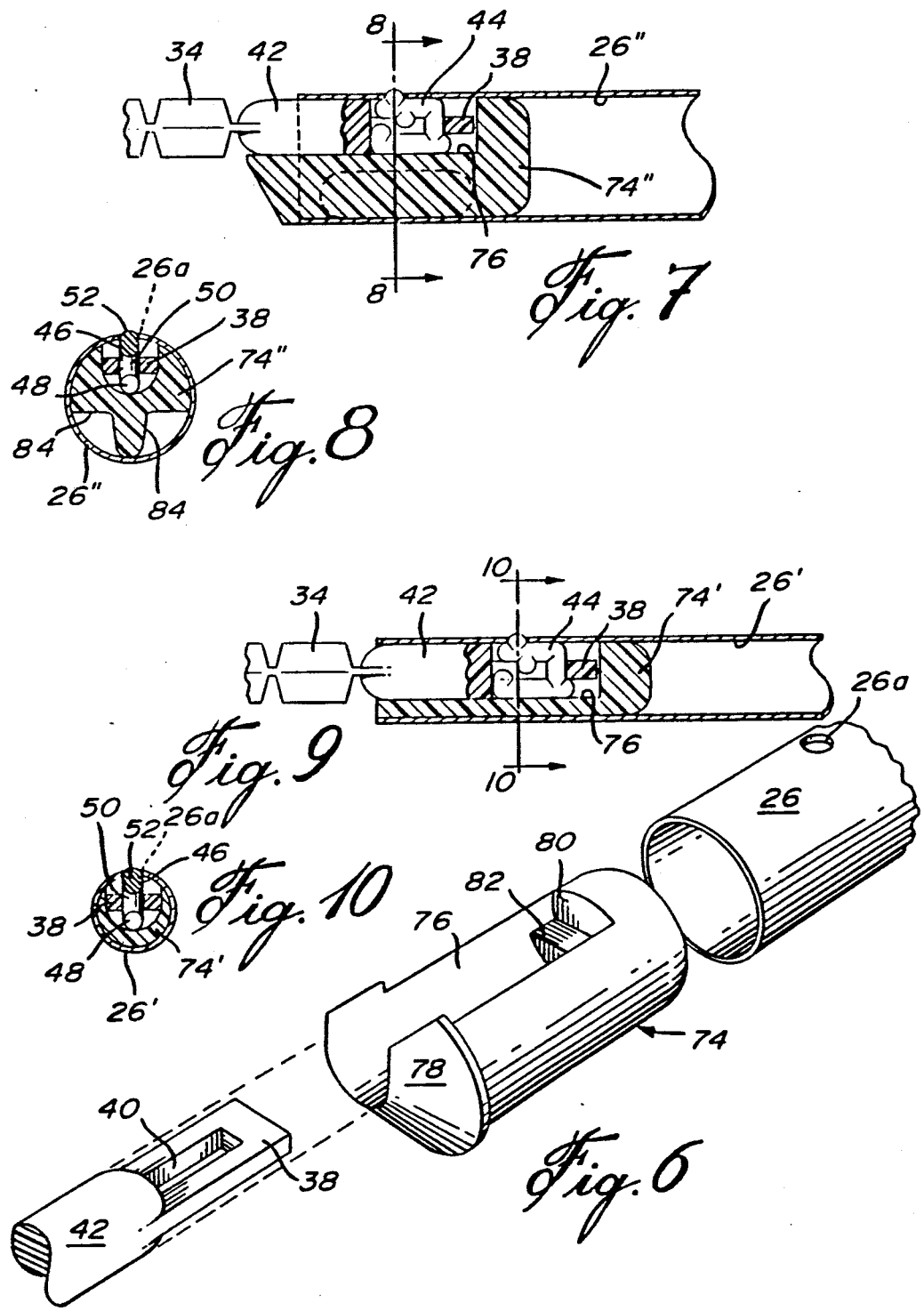

TRUSS BEAM COUPLER

FIELD OF THE INVENTION

This invention relates to releasable couplers for truss structures, with releasable interlocking means of the spring loaded type.

BACKGROUND OF THE INVENTION

Display stand type truss structures are often used in commercial exhibitions. These structures are advantageous, due to the ease associated in the erecting or dismantling thereof. Conventionally, the joints between the triangularly disposed truss beams of the self-standing framework, consist simply of multiple branch stellar shafts, endwisely inserted through the mouths of the hollow tubular beams. The coupler shafts are secured to the tubular beams simply by friction fit therein.

Obviously, such an arrangement is satisfactory for only small load-bearing structures. If the weight of the structure becomes larger, such friction fit force may be too feeble to provide positive interlocking of the tubular elements, whereby doubts can be cast over the rigidity of the self-standing structure. A hazardous condition may therefore follow.

OBJECTS OF THE INVENTION

An object of the invention is to provide releasable interlocking means for display stand truss structures, being particularly easy to install or dismantle.

A corollary object of the invention is to provide such interlocking means, which will be adaptable to tubular truss beams of variable internal diameter.

SUMMARY OF THE INVENTION

Accordingly with the objects of the invention, there is disclosed the combination of a truss beam and coupler assembly, comprising: (a) an elongated arm member defining a cylindrical body portion and a thin body portion, a lengthwise slit made into said thin body portion; (b) a spring-loaded clip member, of generally U-shape, defining first and second lateral legs and a base leg joining said lateral legs, a short finger projecting transversely from the free end portion of said first leg away from said second leg; and (c) an elongated tubular truss beam, open at both ends and defining a cylindrical wall with a transverse bore proximate each open end thereof, and a cylindrical hollow having a diameter substantially equal to the length of said clip base leg and to the diameter of said clip cylindrical body portion, said bore and finger of similar cross-section, said arm member releasably engaged into said truss beam hollow; wherein as said clip second leg seats flatly against said beam wall, and as said clip finger is brought in register with said truss bore, the spring load of said clip first leg will bias said finger into said bore, to interlock said arm member to said truss beam.

An adaptor could be added, for fitting the arm member into a diametrally much larger truss beam.

BRIEF DESCRIPTION OF THE DRAWINGS

FIG. 6, on the third sheet of drawings, is an exploded view of an adaptor for wider diameter truss tubes and associated truss element, arms and tube only part of which being shown;

FIG. 7 is a sectional view of the elements of FIG. 6, in assembled condition for a diametrally larger tube, and also including the locking clip in operative position;

FIG. 8 is a cross-section about line 8—8 of FIG. 7;

FIG. 9 is a view similar to FIG. 7, but for a still wider diameter truss element; and FIG. 10 is a cross-section about line 10—10 of FIG. 9.

DETAILED DESCRIPTION OF THE INVENTION

Figure 1:
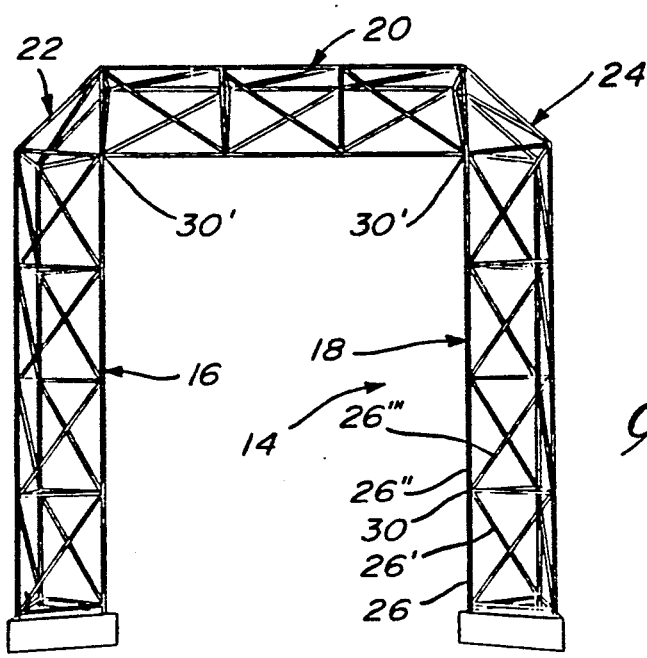
FIG. 1 is an elevational view of a truss assembly formed of truss elements interlocked to one another with couplers according to the invention.

As illustrated in FIG. 1, self-standing truss structure 14 consists of two upright legs 16, 18, transversely supporting a vertical leg 20 at their top ends, about inclined corner truss parts 22, 24. Truss structure 14 is made of combination of tubular bars 26, arranged in series of triangles forming a rigid framework. Each tubular bar 26, 26', 26", . . . defines a circular mouth 28 at each of the two opposite ends thereof. Nodes 30 are defined where any two or more, noncolinear, tubular bars 26, 26', 26", . . . $26^n$ merge with one another in endwise fashion. Coupling means 32 are provided at each node 30, to anchor the merging ends of "n" number of converging bars 26, so as to impart load-bearing rigidity to the framework 14.

Figure 2:
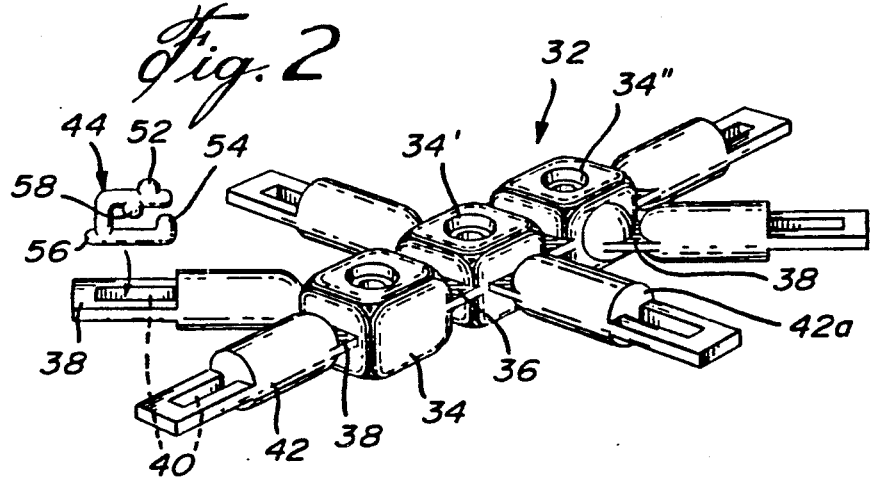
FIG. 2 is a perspective view of interconnected truss node couplers of the invention, for use on the truss elements of FIG. 1, and suggesting how a preferred embodiment of spring-loaded locking clip can be mounted into a corner coupler.

FIG. 2 shows one preferred embodiment of such coupler means 32, for use in interlocking six tubular bars 26 about a node 30 common thereto. Such a multiple branch coupler 32 would be necessary for example about corner portions 22 or 24, to fit onto node 30' (FIG. 1). Coupler 32 consists of one or more—three in our example—box-like casings 34, 34', 34", interconnected in colinear fashion by integral, thin, joint plates 36. One, two or three elongated, rectangular arms 38 transversely depend from corresponding walls of each box-like casing 34. Each arm 38 makes with the corresponding wall of casing 34 to which it is anchored, either an acute angle—e.g. 30°—or is orthogonal thereto.

The free end section of each arm 38 (opposite casing 34) defines a cylindrical, full extension 42, forming a flat discoid seat 42a at its outer end and a semi-spherical end 42b at its opposite inner end. Discoid wall 42a defines the inner end of slit 40. Cylinder body 42 is diametrally similar in size to the cylindrical inner hollow of tubular bar 26, so that the former be freely engageable through mouth 28 frictionally into bar 26, as illustrated in FIG. 5.

Accordingly with the heart of the invention, a clip member 44 is freely inserted into slit 40. Clip 44 consists of an elongate rod bent to form a generally U-shape. U-shape clip 44 is substantially rigid, yet spring-loaded, i.e. that its two parallel legs 46, 48 may be forcibly brought toward one another, but the clip resiliency about base leg 50 will bring legs 46 and 48 back to their original condition—parallel to one another—upon release of the forcible bias. Leg 46 is slightly shorter than slit 40, while leg 48 is slightly longer than slit 40, and the overall width of U-clip 44 is substantially equal to the diameter of cylindrical body 42.

Figure 5:
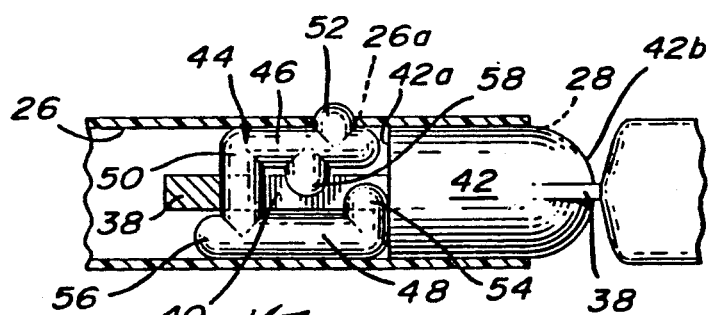
FIG. 5, on the first sheet of drawings, is a sectional view of one tubular coupler, clearly showing the locking clip in operative position.
Figure 3:
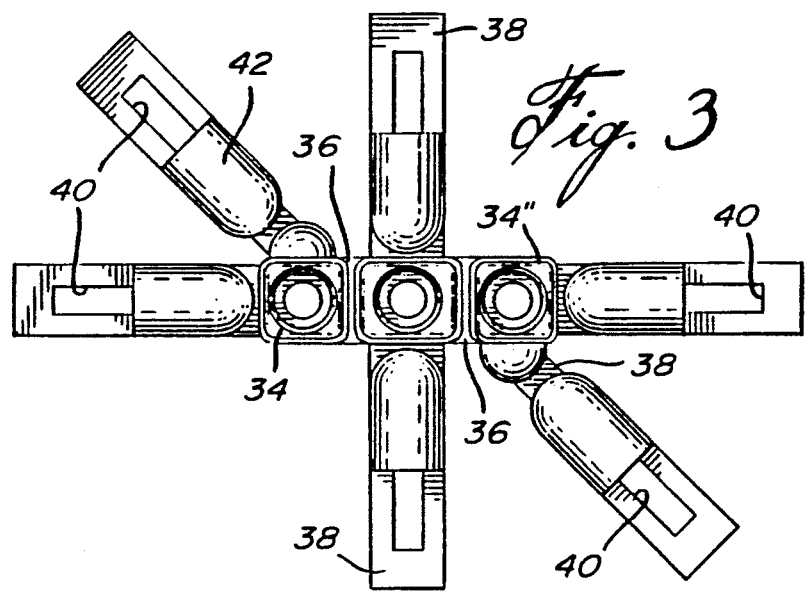
FIG. 3 is a plan view of the interconnected node couplers of FIG. 2.

Therefore, as illustrated in FIG. 5, U-clip 44 is insertable into slit 40 by engaging its short leg 46 therethrough, whereby its base leg 50 extends orthogonally to the plane of slit 40, while legs 46 and 48 are located on opposite sides of that plane. Then, by engaging tubular bar 26 over branch 38 including cylinder body 42, clip 44 becomes trapped into tube 26.

Tube 26 includes a transverse circular bore 26a about its free end section, spacedly of mouth 28. Short leg 46 further includes a transverse, outwardly projecting finger 52, of semi-spherical shape, located proximate its free end. Finger 52 and bore 26a have similar diameters. In this embodiment of tube 26 whose hollow is diametrally similar to the width of clip 44, since the clip long leg seats against the adjacent wall section of tube 26—opposite bore 26a—, finger 52 will engage through and remain within bore 26a under the bias of the spring loaded clip 44, upon bringing finger 52 and bore 26a to register with one another.

It is understood that, as arm 38 is initially inserted through mouth 28 of tube 26, base leg 50 constitutes the leading edge of clip 44, whereby mouth 28 will transversely strike finger 52 after insertion of leg 50 and of the main portion of legs 46 and 48. One needs only to manually push resilient short leg 46 toward long leg 48, to allow finger 52 to clear mouth 28 for ingress of all of clip 44 into tube 26. Upon further pushing of branch 38 into the hollow of tube 26, the bore 26a may be adjustably brought to register with finger 52, which will release thereinto with spring back effect.

By insertion of button 52 through bore 26a, tube 26 is positively locked to casing 34. To unlock same, one needs only to push button 52 into tube 26.

Preferably, up to three additional semi-spherical fingers—FIG. 5—are added to clip 44, namely, fingers 54, 56 and 58.

Finger 54 projects transversely inwardly from the free end of long leg 48. When clip 44 rests in its operative position, into slit 40, finger 54 abuts against discoid wall 42a while base leg 50 abuts flatly against the free end of arm 38. Hence, clip 44 is prevented from moving within slit 40 axially of elongated arm 38.

Finger 56 axially projects from the inner end of leg 48, opposite transverse finger 54. The free end of arm 38 is to simply seat onto finger 56, to provide a positive stop means during clip insertion into slit 40, so that the required operative positioning of clip coaxially with cylindrical body 42 become an automatic, straightforward operation.

Finger 58 transversely projects inwardly from an intermediate section of the short leg 46, and preferably slightly offset transversely from the other outward finger 52. Fingers 54 and 58, by abutting on the opposite lateral walls 38 of rectangular slit 40, prevent undesirable tilting motion of clip 44 into slit 40 when button 52 is released from outlet bore 26a.

Figure 4:
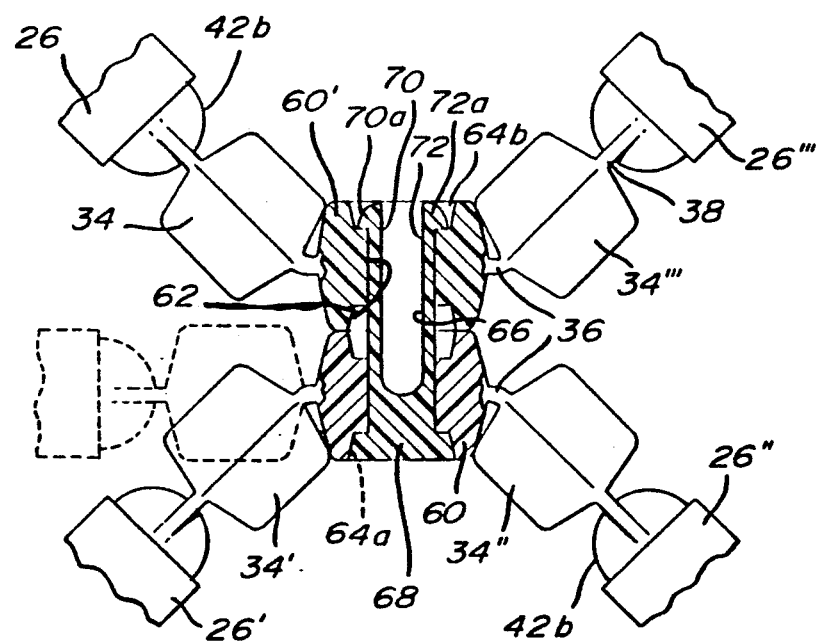
FIG. 4 is a sectional view at an enlarged scale, of an interlocked nut assembly for use in lateral branching of tubular arm couplers, the latter being shown in partly broken, shadow outline.

FIG. 4 shows a coupling arrangement for lateral branching of tubular arms 26. Each pair of connecting strips 36 of arms 38 is anchored at an angle—e.g. 30°—to corresponding faces of a given rigid nut member 60. Nut 60 defines an unthreaded, central channel 62, countersunk at each of its two opposite ends so as to define therein enlarged annular seats 64a, 64b. Two or more nuts 60, 60' are releasably interlocked by a spring-loaded, U-shape plug 66. Plug 66 defines an enlarged head to fit into one annular seat 64a of a first nut 60, and two spring-loaded legs 70, 72 resiliently movable relative to one another. The free ends of legs 70, 72 are arrow shaped at 70a, 72a, to hook with annular seat 64b of second nut 60', under the spring loaded bias of legs 70, 72 to interlock nuts 60 and 60'.

FIG. 6 shows how a tubular adaptor 74 enables arm 38 and clip 44 to interlock tubes 26 of much greater interior diameter than cylindrical part 42 of arm 38. Adaptor 74 is generally cylindrical, with a semi-cylindrical lengthwise cavity 76 and an enlarged rim 78 at one end forming a head. Cavity 76 opens freely through rim 78, but stops short of the opposite end of tube 74, wherein a radial seat 80 is defined. Preferably, a small semi-circular pad 82 is lodged against the lower corner of end portion 80 of cavity 76.

It is understood that arm 38 is to snugly fit into mating channel or cavity 76, so that finger 52 be able to reach and engage bore 26a of larger diameter tube 26' or 26''. Pad 82 is destined to support the free end of arm 38. In the case of a tube 26' of still larger diameter—FIGS. 7-8—, tubular adaptor 74' need not be full but could have lengthwise cut outs 84 (FIG. 8) to reduce weight.

Tubes 26 are usually made from aluminum, but could be made from other suitable materials. The adaptor 74 is preferably made from polypropylene. The nut 60, plug 66, and clip 44 are preferably made from a substantially rigid, yet resiliently elastic nylon material.

I claim:

1. The combination of a truss beam and coupler assembly, comprising:
   (a) an elongated arm member defining a cylindrical body portion at one end and a thin body portion at the other end, a lengthwise slit made into said thin body portion;
   (b) a spring-loaded clip member, of generally U-shape, defining first and second lateral legs and a base leg joining said lateral legs, a short finger projecting transversely from the free end portion of said first leg away from said second leg, said clip freely engaged into said arm slit with said lateral legs extending axially of said arm member toward said cylindrical body portion; and
   (c) an elongated tubular truss beam, open at both ends and defining a cylindrical wall with a transverse bore proximate each open end thereof, the hollow of said cylindrical wall having a diameter substantially equal to the length of said clip base leg and to the diameter of said clip cylindrical body portion, said bore and finger being of identical cross-section, said arm member releasably engaged into said truss beam hollow with said thin body portion as the leading edge thereof;
   wherein as said clip finger is brought in register with said truss bore, the spring load of said clip first leg will bias said finger into said bore, to releasably interlock said arm member to said truss beam.

2. The combination of a truss beam and coupler assembly, comprising:
   (a) an elongated arm member defining a cylindrical body portion at one end and a thin body portion at the other end, a lengthwise slit made into said thin body portion;
   (b) a spring-loaded clip member, of generally U-shape, defining first and second lateral legs and a base leg joining said lateral legs, a short finger projecting transversely from the free end portion of said first leg away from said second leg, said clip freely engaged into said arm slit with said lateral legs extending axially of said arm member toward said cylindrical body portion;

(c) an elongated tubular truss beam, open at both ends and defining a cylindrical wall with a transverse bore proximate each open end thereof, the hollow of said cylindrical wall having a diameter substantially larger than the length of said clip base leg and the diameter of said clip cylindrical body portion, said bore and finger being of identical cross-section; and (d) an adaptor member, of generally cylindrical shape so as to define a diameter substantially equal to said beam cylindrical hollow, and defining a semi-cylindrical cavity defining a diameter substantially equal to said arm member cylindrical body portion and to the length of said clip base leg, whereby said arm member is releasably engaged into said adaptor member cavity and said adaptor member is engaged into said truss beam hollow;

wherein as said clip finger is brought in register with said truss bore, the spring load of said clip first leg will bias said finger into said bore, to releasably interlock said arm member to said truss beam.

3. A truss beam and coupler combination as defined in claim 2, wherein said adaptor member includes lengthwise cut-outs, to substantially reduce its weight.

4. A truss beam and coupler combination as defined in claim 1, with said arm slit being rectangular and said cylindrical body portion defining a flat discoid end wall adjacent said slit, wherein said clip first leg is shorter than said lengthwise slit, so as to clear said discoid wall, and said clip second leg further extends at its inner end beyond said clip base leg beneath said arm thin portion and abuts said discoid wall at its outer end.

5. A truss beam and coupler combination as defined in claim 2, with said arm slit being rectangular and said cylindrical body portion defining a flat discoid end wall adjacent said slit, wherein said clip first leg is shorter than said lengthwise slit, so as to clear said discoid wall, and said clip second leg further extends at its inner end beyond said clip base leg beneath said arm thin portion and abuts said discoid wall at its outer end.

6. A truss beam and coupler combination as in claim 1, wherein said clip finger is semi-spherical, and said truss bore, circular.

7. A truss beam and coupler combination as in claim 1, further including a pair of nut members, one of said nut members being anchored to said arm cylindrical body portion and extending outwardly of said truss beam hollow, and the other of said nut members destined to befit the arm member of a second truss beam and coupler combination, each nut member defining an unthreaded central channel countersunk at both ends thereof, and further including a U-shape plug provided with two arrow shaped hook members at its free ends and with an enlarged head opposite said hook members, said plug extending through said channels of both nut members with said hook members thereof releasably engaging a countersunk portion of one said nut member and with said head engaging the opposite countersunk portion of the other said nut member, for interlocking both said truss beams accordingly with a lateral brancing arrangement of tubular truss beams.

* * * * *